Patented Sept. 9, 1947

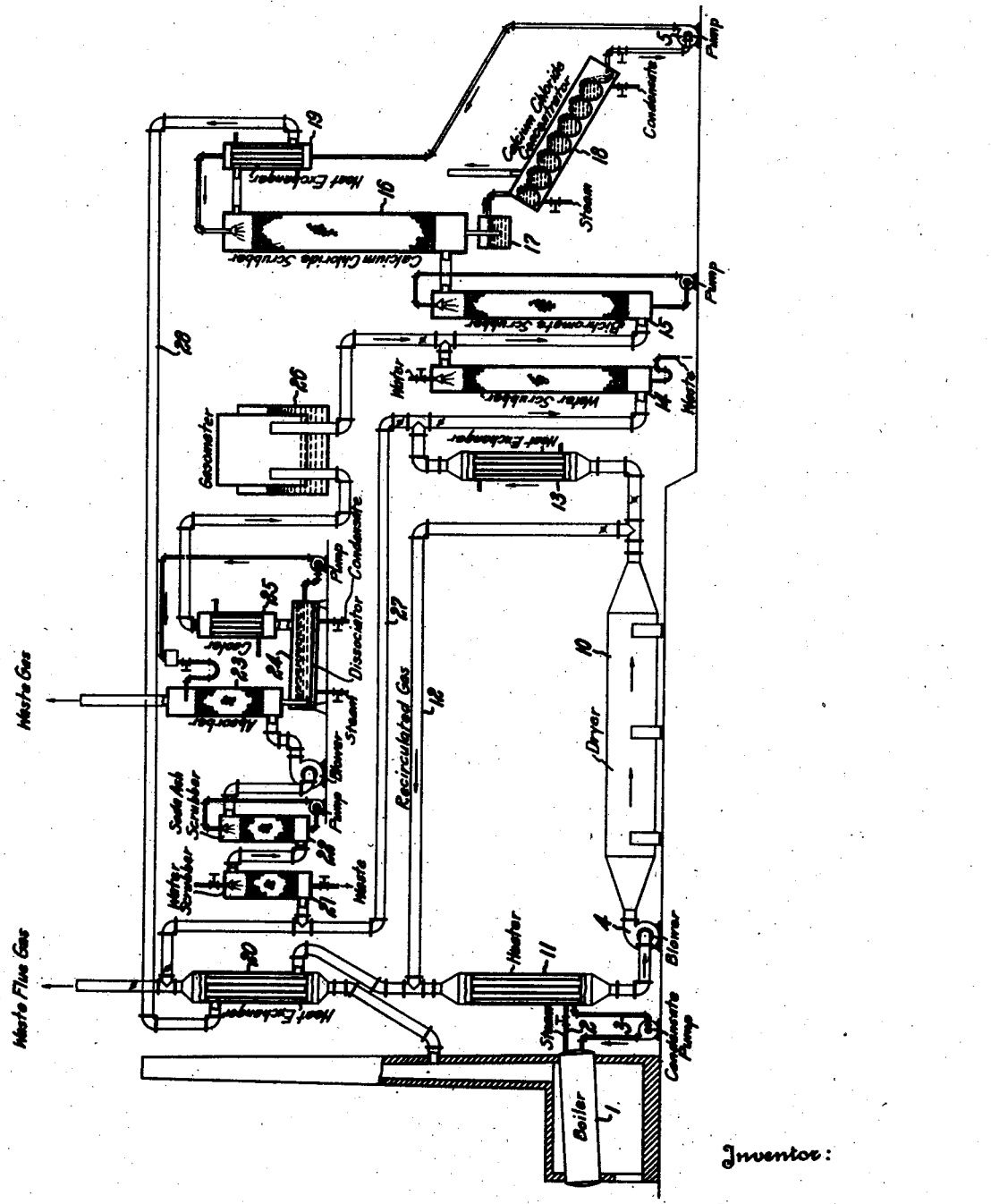

2,427,302

UNITED STATES PATENT OFFICE 2,427,302

DEHYDRATION OF FOODSTUFFS WITH CARBON DIOXIDE

Gustave T. Reich, Philadelphia, Pa.

Application August 26, 1943, Serial No. 500,176

10 Claims. (Cl. 34—32)

This invention relates to the dehydration of foodstuffs, particularly with the use of a carrier gas stream consisting largely of an inert gas.

It is known that indifferent gases such as carbon dioxide or nitrogen are more desirable for the dehydration of food products than air, as they not only prevent oxidation and minimize the loss of vitamins, but the products have a better appearance and longer shelf life.

The limited use of these indifferent gases can be attributed to the fact that, according to the present methods of processing food products, the cost of the use of indifferent gases is prohibitive. Also, the dilution of the gas with air below a certain point, would not result in a desirable product. Furthermore, the diluted gas could not be recycled. Other disadvantageous features of the dehydrating processes are that regardless of whether air or a mixture of air and an excess of indifferent gas, such as carbon dioxide, is used, it ultimately becomes so contaminated with volatile organic odorous substances that when recycling the air becomes worse owing to the continuous reheating. For instance, when drying meat the oxygen in the air increases the free fatty acid content, thereby increasing the odor and the air becomes worse and worse, so much so that while the cooled, dehydrated product may not have a strong odor, nevertheless, upon cooking its taste is far from palatable.

It has been found that by means of the novel method of operation of the invention a dehydrating plant could use exclusively indifferent gases such as carbon dioxide, or such gases partly diluted with air, say down to 30% of carbon dioxide, at a cost which would permit their use on a large scale in the food industry. In general, the method of the invention comprises heating a gas to the temperature for effective dehydration, passing the gas in direct contact with the foodstuff, thereafter bringing the gas into direct contact with an extended surface stream of water to remove vapors and water-soluble organic substances and returning the gas to the heating and dehydrating operations. Preferably the gas is subjected to indirect cooling before contacting it with the stream of water, and it may advantageously be treated with odor-removing agents or with moisture-absorbing agents, or both, after contacting it with the water stream.

In the standard air dehydrators, the air after passing through them, is either all wasted or divided into two parts, of which one part is recycled while the other part is allowed to escape and is replaced with fresh air. If all the air is wasted, the cost of heating the fresh air is quite high. On the other hand, part of the moisture laden air must escape and it has also been found necessary that it do so to prevent the accumulation of the odorous, volatile impurities which have a tendency to impart an unpleasant odor to the processed foods.

When using carbon dioxide continuous re-use has a detrimental effect upon the food products, while discarding it is not practical owing to its high cost.

The method of the invention will be more particularly described with reference to the accompanying drawing diagrammatically showing a food dehydrating plant utilizing a carrier gas stream containing a substantial proportion of carbon dioxide and embodying the principles of the invention.

Boiler 1, which may also supply steam for processing the foodstuffs, supplies steam through line 2 to heater 11 which serves for the heating of the indifferent gas required for dehydration. The condensate from the heater is returned to the boiler in line 3. Preferably the gas is forced into the dehydrator by means of a blower 4. It is desirable, if possible, to carry a very slight pressure, say ½–1″ of water, on the dryer so as to prevent air infiltration.

A dehydrator 10 which can be of any conventional design suitable for the dehydration of specific foods may be used in the process. Preferably the dehydrator is designed to withstand a slight pressure, say ½″–1″ water pressure, thereby preventing, as far as possible, the dilution of the indifferent gas. An indifferent gas containing, for example, from 30% to 100% by volume of carbon dioxide, is heated in heater 11 to a predetermined temperature depending upon the food to be dehydrated. I have found that the temperature in the dehydrator in the presence of an indifferent gas, such as carbon dioxide, can be maintained from 15°–50° F. higher than when air is used without a detrimental effect upon the food product. Such an increase of temperature has the advantages of quicker drying, smaller dehydrator and less volume of gas to be handled; consequently, a smaller purification and drying system is required. For example:

|  | Dried with air | Dried with carbon dioxide |
|---|---|---|
|  | °F. | °F. |
| Apples | 160 | 180–200 |
| Asparagus | 145–155 | 175–180 |
| Cauliflower | 140–150 | 165–175 |
| Carrots | 150–160 | 175–185 |
| Lima beans | 145–150 | 165–170 |
| Potatoes | 150–160 | 190–200 |

This table merely shows the difference in the drying temperatures of various food products with air and carbon dioxide. Obviously, at the higher temperature the gas will carry a considerably higher moisture content than at the lower temperature.

The following table shows saturated water vapor per one pound of dry air at 29.92 inches Hg pressure.

| Temp. | Pounds saturated water vapors per one pound of dry air |
|---|---|
| 60° F | .012 |
| 80° F | .0225 |
| 140° F | .152 |
| 150° F | .208 |
| 160° F | .298 |
| 170° F | .455 |
| 180° F | .660 |
| 190° F | 1.010 |
| 200° F | 2.030 |

These tables show the great advantage to be gained by the use of carbon dioxide and the higher temperature possible with that gas.

After the indifferent gas leaves the dehydrator, the gas may be passed into the deodorizing and drying system, or partly recirculated directly to heater 11 through pipe 12. The gas may pass first through a heat exchanger 13 to partially cool the gas and then into the water scrubber 14 which may contain coke or any suitable filler, where cold water removes a large percentage of the odorous substances present in the gas. The water also cools the gas to a temperature of say from 190° F. to 80° F., thereby reducing its moisture content, if the gas is 50% saturated, from .550 pound of water per pound of dry air to a 100% saturation at 80° F. containing .0225 pound. The advantage of this scrubbing system is quite great as later on less water must be removed in the dryer. The scrubber can be of any suitable design, using coke, stoneware or wooden tower fillers. The scrubbing water is wasted.

From the water scrubber the gas now passes to the oxidizing scrubber 15, containing, for instance, a five per cent solution of a hexavalent chromium compound for deodorizing purposes. Potassium permanganate may be used, but the hexavalent chromium compounds, such as sodium or potassium bichromate, are particularly effective. The liquid in the scrubber may be circulated by means of a pump.

The gas containing oxidized impurities passes now to the dryer 16 where its moisture content and oxidized impurities are removed by concentrated calcium chloride solution or other hygroscopic solution. The calcium chloride enters the top of the scrubber warm, at say 110°–120° F., and flows downwards, counter-current to the deodorized gas which enters at the bottom and leaves at the top in fairly dry condition.

The calcium chloride solution flows from the bottom of the scrubber into a receiving tank 17 and then preferably into a cascade evaporator 18 where the water which has been removed from the gas is driven off. The concentration of the calcium chloride solution is carried on either at atmospheric pressure or under vacuum, depending upon the food product dehydrated. When meat or food products with strong odors, such as onions, are dehydrated, the solution is preferably concentrated under vacuum, while when the gas has been used for the dehydration of potatoes, for example, atmospheric concentration is satisfactory.

It has been found that the odorous substances have, in some instances, a greater affinity to water than to the indifferent gas. Consequently, the removal of the water in the scrubbers will be accompanied by the removal of the odorous substances, especially in the large volume of calcium chloride solution circulated through the scrubber 16. The absorbed odorous substances are removed during the concentration of the calcium chloride solution.

The hot calcium chloride solution passing through the heat exchanger 19 may heat the dried gas coming from the calcium chloride scrubber or the gas may be preheated before entering the scrubber. By maintaining a fairly high temperature of the scrubbing liquid, the heat requirements for the concentration of the used calcium chloride solution are not very great.

The deodorized, dried gas is now returned to the dehydrator system through pipe 28, being heated with steam in heater 11 or preheated in the flue gas heat exchanger 20.

During processing there is always some gas lost and, while the loss may not be high, a certain predetermined amount of gas must be circulated per minute so as to carry on the drying efficiently. The loss of gas must be replaced with new gas. However, as the carbon dioxide is to be used in a gaseous state—partly diluted, to say 30—70% with air, the cost of using liquid or solid carbon dioxide would be quite high, owing to the cost of compressing, liquefying and production of solid carbon dioxide in presses. As only gaseous carbon dioxide is required, it may be produced of quite a high purity and at low cost from flue gases according to the processes described in my U. S. Patents Nos. 2,183,324; 2,205,962; 2,256,962 and 2,257,533.

A suitable system for obtaining carbon dioxide from the flue gases from boiler 1 in accordance with my patented processes may comprise a water scrubber 21, soda ash scrubber 22, absorber 23, dissociator 24, cooler 25, and gas holder 26.

The carbon dioxide may be passed from the gas holder, or if desired, directly from the dissociator to the bichromate scrubber 15 and calcium chloride dryer 16.

The absorption system may also be used to fortify the gas in the dehydration system, whenever its carbon dioxide content may become unduly diluted by the infiltration of air, by passing gas from the dehydration system to the absorption system through pipe 27.

It will be obvious that the arrangement of apparatus as shown and described is merely illustrative of the principles of the invention.

I claim:

1. In the dehydration of foodstuffs, the method which comprises heating a carrier gas stream consisting of a substantial proportion of carbon dioxide to a temperature effective to dehydrate the foodstuff, passing the heated gas stream in direct contact with the foodstuff, thereafter bringing at least a portion of the gas into direct contact with an extended surface stream of water to condense a substantial portion of the moisture content and to remove water-soluble organic substances, contacting the gas with a solution of a hexavalent chromium compound, and returning the gas to the gas stream being heated.

2. In the dehydration of foodstuffs, the method which comprises heating a carrier gas stream consisting of a substantial proportion of carbon dioxide to a temperature effective to dehydrate the foodstuff, passing the heated gas stream in direct contact with the foodstuff, thereafer bringing a least a portion of the gas into direct contact with an extended surface stream of water to condense a substantial portion of the moisture content and to remove water-soluble organic substances, contacting the gas with a solution of a hexavalent chromium compound, removing a further portion of the moisture content of the gas, and returning the gas to the gas stream being heated.

3. In the dehydration of foodstuffs, the method which comprises heating a carrier gas stream consisting of a substantial proportion of carbon dioxide to a temperature effective to dehydrate the foodstuff, passing the heated gas stream in direct contact with the foodstuff, thereafter bringing at least a portion of the gas into direct contact with an extended surface stream of water to condense a substantial portion of the moisture content and to remove water-soluble organic substances, contacting the gas with a solution of a hexavalent chromium compound, removing a further portion of the moisture content of the gas by contacting the gas with a hygroscopic solution, and returning the gas to the gas stream being heated.

4. In the dehydration of foodstuffs, the method which comprises heating a carrier gas stream consisting of a substantial proportion of carbon dioxide to a temperature effective to dehydrate the foodstuff, passing the heated gas stream in direct contact with the foodstuff, thereafter bringing at least a portion of the gas into direct contact with an extended surface stream of water to condense a substantial portion of the moisture content and to remove water-soluble organic substances, contacting the gas with a solution of a hexavalent chromium compound, removing a further portion of the moisture content of the gas by contacting the gas with a concentrated solution of calcium chloride, and returning the gas to the gas stream being heated.

5. In the dehydration of foodstuffs, the method which comprises heating a carrier gas stream containing at least 30% of carbon dioxide to a temperature effective to dehydrate the foodstuff, passing the heated gas stream in direct contact with the foodstuff, thereafter absorbing the carbon dioxide from a portion of the gas stream, removing the absorbed carbon dioxide from the absorbent, contacting the remainder of the gas stream with an extended surface stream of water to condense a substantial portion of the moisture content and to remove water-soluble organic substances, combining the carbon dioxide removed from said absorbent with said remainder of the gas stream, and returning the combined gas to the gas stream being heated.

6. In the dehydration of foodstuffs, the method which comprises heating a carrier gas stream containing at least 30% of carbon dioxide to a temperature effective to dehydrate the foodstuff, passing the heated gas stream in direct contact with the foodstuff, thereafter absorbing the carbon dioxide from a portion of the gas stream, removing the absorbed carbon dioxide from the absorbent, contacting the remainder of the gas stream with an extended surface stream of water to condense a substantial portion of the moisture content and to remove water-soluble organic substances, combining the carbon dioxide removed from said absorbent with said remainder of the gas stream, contacting the combined gas with a solution of hexavalent chromium compound, and returning the combined gas to the gas stream being heated.

7. In the dehydration of foodstuffs, the method which comprises heating a carrier gas stream containing at least 30% of carbon dioxide to a temperature effective to dehydrate the foodstuff, passing the heated gas stream in direct contact with the foodstuff, thereafter absorbing the carbon dioxide from a portion of the gas stream, removing the absorbed carbon dioxide from the absorbent, contacting the remainder of the gas stream with an extended surface stream of water to condense a substantial portion of the moisture content and to remove water-soluble organic substances, combining the carbon dioxide removed from said absorbent with said remainder of the gas stream, contacting the combined gas with a solution of hexavalent chromium compound, removing a further portion of the moisture content of the combined gas by contacting the combined gas with a hygroscopic solution, and returning the combined gas to the gas stream being heated.

8. In the dehydration of foodstuffs, the method which comprises heating a carrier gas stream containing at least 30% of carbon dioxide to a temperature effective to dehydrate the foodstuff, passing the heated gas in direct contact with the foodstuff, contacting the gas stream with an extended surface stream of water to condense a substantial portion of the moisture content and to remove water-soluble organic substances, absorbing carbon dioxide from flue gas, removing the absorbed carbon dioxide from the absorbent, combining the carbon dioxide removed from said absorbent with said gas stream, contacting the combined gas with a solution of hexavalent chromium compound, and returning the combined gas to the gas stream being heated.

9. In the dehydration of foodstuffs, the method which comprises heating a carrier gas stream containing at least 30% of carbon dioxide to a temperature effective to dehydrate the foodstuff, passing the heated gas in direct contact with the foodstuff, contacting the gas stream with an extended surface stream of water to condense a substantial portion of the moisture content and to remove water-soluble organic substances, absorbing carbon dioxide from flue gas, removing the absorbed carbon dioxide from the absorbent, combining the carbon dioxide removed from said absorbent with said gas stream, contacting the combined gas with a solution of hexavalent chromium compound, removing a further portion of the moisture content of the combined gas by contacting the combined gas with a hygroscopic solution, and returning the combined gas to the gas stream being heated.

10. In the dehydration of foodstuffs, the method which comprises heating a carrier gas stream consisting of a substantial proportion of carbon dioxide to a temperature effective to dehydrate the foodstuff, passing the heated gas stream in direct contact with the foodstuff, thereafter bringing at least a portion of the gas into direct contact with an extended surface stream of water to condense a substantial portion of the moisture content and to remove water-soluble organic substances, contacting the gas with a solution of a hexavalent chromium compound, removing a further portion of the moisture and water-soluble organic substances contained in the gas by contacting the gas with a concentrated solution of calcium chloride, and returning the gas to the gas stream being heated.

GUSTAVE T. REICH.

REFERENCES CITED

The following references are of record in the file of this patent:

UNITED STATES PATENTS

| Number | Name | Date |
|---|---|---|
| 226,908 | Edwards | Apr. 27, 1880 |
| 871,194 | Thomas | Nov. 19, 1907 |
| 910,525 | Gardner | Jan. 26, 1909 |
| 2,225,131 | Reich | Dec. 17, 1940 |
| 2,183,324 | Reich | Dec. 12, 1939 |
| 2,205,962 | Reich | June 25, 1940 |
| 2,256,962 | Reich | Sept. 23, 1941 |
| 2,257,533 | Reich | Sept. 30, 1941 |
| 550,681 | Hiorth | Dec. 3, 1895 |
| 1,144,817 | Dale | June 29, 1915 |
| 1,756,992 | Quiggle | May 6, 1930 |
| 2,249,624 | Bichowsky | July 15, 1941 |
| 2,333,850 | Dunkley | Nov. 9, 1943 |

FOREIGN PATENTS

| Number | Country | Date |
|---|---|---|
| 17,295/28 | Australia | Dec. 10, 1928 |
| 569,094 | France | Jan. 4, 1924 |